US012639289B2

(12) United States Patent
Lee et al.

(10) Patent No.: US 12,639,289 B2
(45) Date of Patent: May 26, 2026

(54) DATABASE CONTROL USING MACHINE LEARNING BASED PREDICTION

(71) Applicant: Dell Products L.P., Round Rock, TX (US)

(72) Inventors: Shu Hsien Lee, Air Itam (MY); Lead Ta Choo, Puchong (MY); Dolton Ansolmus John, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/646,874

(22) Filed: Apr. 26, 2024

(65) Prior Publication Data

US 2025/0335426 A1     Oct. 30, 2025

(51) Int. Cl.
*G06F 16/00*      (2019.01)
*G06F 11/34*      (2006.01)
*G06F 16/23*      (2019.01)

(52) U.S. Cl.
CPC ...... *G06F 16/2379* (2019.01); *G06F 11/3414* (2013.01); *G06F 11/3423* (2013.01)

(58) Field of Classification Search
CPC ............. G06F 16/2379; G06F 11/3414; G06F 11/3423
See application file for complete search history.

(56) References Cited

U.S. PATENT DOCUMENTS

2022/0284035 A1*  9/2022  Butterstein ......... G06F 11/1471
2025/0117240 A1*  4/2025  Qi ....................... G06F 9/45558

OTHER PUBLICATIONS

Guo, et al.; "Model-driven Geo-Elasticity In Database Clouds"; 2015 IEEE 12th International Conference on Autonomic Computing; 2015.
Paul, et al.; "DatabaseWorkload Characterization with Query Plan Encoders"; Proceedings of the VLDB Endowment, vol. 15, No. 4.
Curino et al.; "Workload-Aware Database Monitoring and Consolidation"; https://dspace.mit.edu/handle/1721.1/74218; DSpace@MIT; Jun. 2011.

* cited by examiner

*Primary Examiner* — Syed H Hasan
(74) *Attorney, Agent, or Firm* — Ryan, Mason & Lewis, LLP

(57)          ABSTRACT
Techniques are provided for database control using machine learning based prediction. One method includes obtaining first and second sets of designated database metrics characterizing active sessions and waiting sessions, respectively, of a database workload for one or more designated time intervals; evaluating an amount of work performed by the active and waiting sessions of the database workload within a designated time interval; applying historical workload data of the database workload to a machine learning model to obtain a forecasted amount of work performed by the database workload within a subsequent designated time period; and initiating an automated action using the forecasted amount of work. The active sessions may utilize one or more database resources and the waiting sessions may execute in response to an occurrence of a designated event.

20 Claims, 16 Drawing Sheets

1400 — OBTAIN A FIRST SET OF DESIGNATED DATABASE METRICS CHARACTERIZING ONE OR MORE ACTIVE SESSIONS OF AT LEAST ONE DATABASE WORKLOAD FOR ONE OR MORE DESIGNATED TIME INTERVALS

1402 — OBTAIN A SECOND SET OF DESIGNATED DATABASE METRICS CHARACTERIZING ONE OR MORE WAITING SESSIONS OF THE AT LEAST ONE DATABASE WORKLOAD FOR THE ONE OR MORE DESIGNATED TIME INTERVALS

1404 — EVALUATE AN AMOUNT OF WORK PERFORMED BY THE ONE OR MORE ACTIVE SESSIONS AND THE ONE OR MORE WAITING SESSIONS OF THE AT LEAST ONE DATABASE WORKLOAD WITHIN AT LEAST ONE DESIGNATED TIME INTERVAL BY AGGREGATING THE FIRST AND SECOND SETS OF DESIGNATED DATABASE METRICS FOR THE AT LEAST ONE DESIGNATED TIME INTERVAL

1406 — APPLY HISTORICAL WORKLOAD DATA OF THE AT LEAST ONE DATABASE WORKLOAD TO ONE OR MORE MACHINE LEARNING MODELS TO OBTAIN A FORECAST OF AN AMOUNT OF WORK PERFORMED BY THE AT LEAST ONE DATABASE WORKLOAD FOR ONE OR MORE DESIGNATED TIME INTERVALS WITHIN AT LEAST ONE SUBSEQUENT DESIGNATED TIME PERIOD

1408 — INITIATE AT LEAST ONE AUTOMATED ACTION USING THE FORECAST OF THE AMOUNT OF WORK PERFORMED BY THE AT LEAST ONE DATABASE WORKLOAD FOR THE ONE OR MORE DESIGNATED TIME INTERVALS

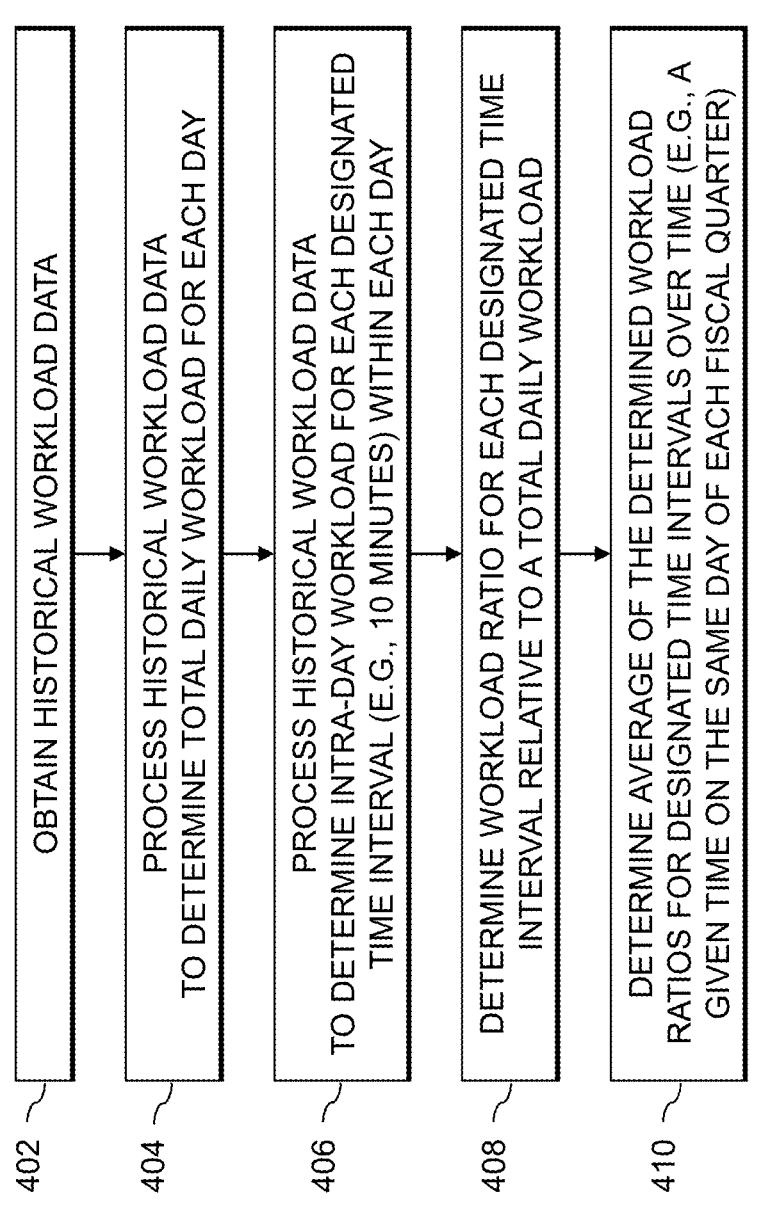

402  OBTAIN HISTORICAL WORKLOAD DATA

404  PROCESS HISTORICAL WORKLOAD DATA TO DETERMINE TOTAL DAILY WORKLOAD FOR EACH DAY

406  PROCESS HISTORICAL WORKLOAD DATA TO DETERMINE INTRA-DAY WORKLOAD FOR EACH DESIGNATED TIME INTERVAL (E.G., 10 MINUTES) WITHIN EACH DAY

408  DETERMINE WORKLOAD RATIO FOR EACH DESIGNATED TIME INTERVAL RELATIVE TO A TOTAL DAILY WORKLOAD

410  DETERMINE AVERAGE OF THE DETERMINED WORKLOAD RATIOS FOR DESIGNATED TIME INTERVALS OVER TIME (E.G., A GIVEN TIME ON THE SAME DAY OF EACH FISCAL QUARTER)

FIG. 4

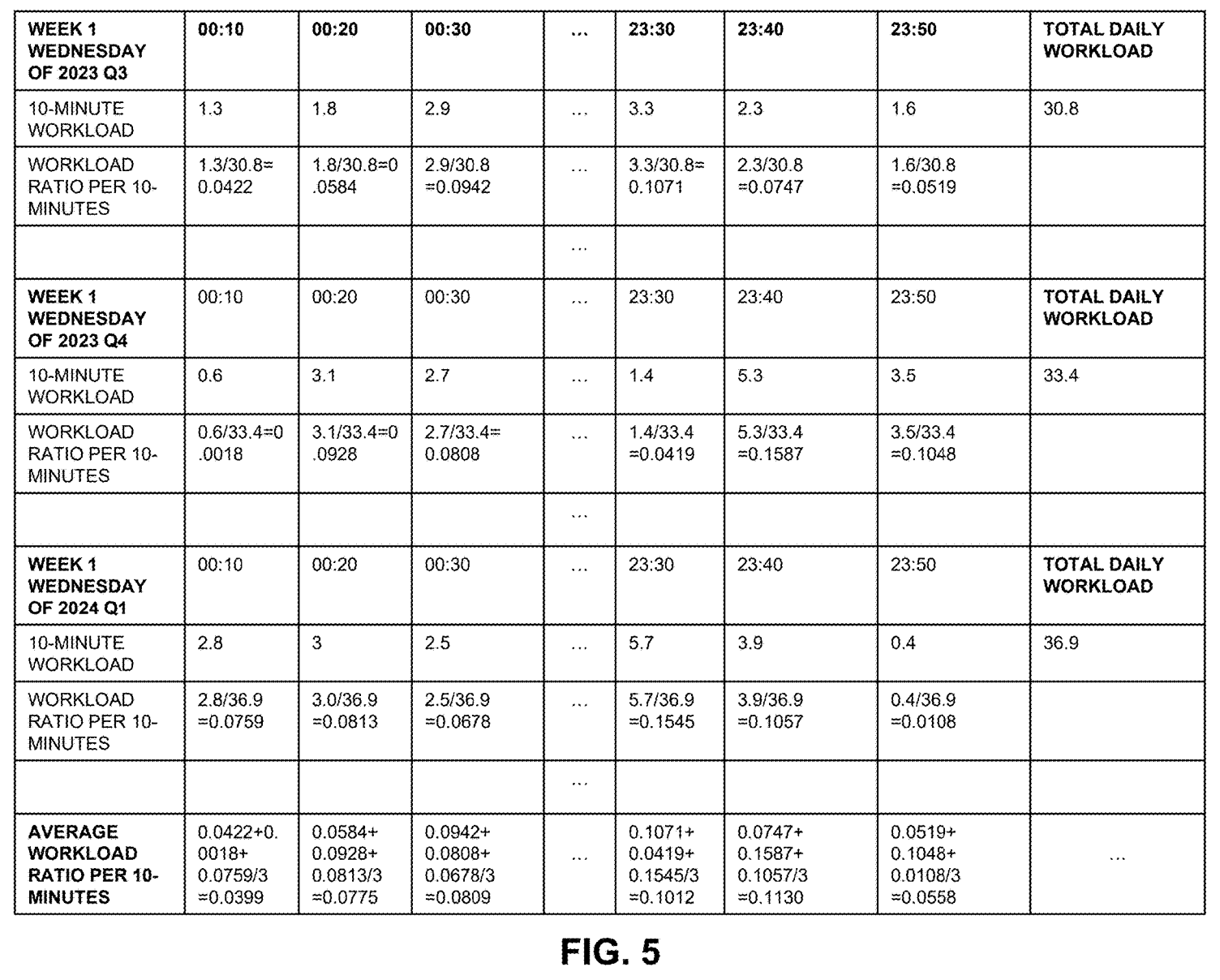

| WEEK 1 WEDNESDAY OF 2023 Q3 | 00:10 | 00:20 | 00:30 | ... | 23:30 | 23:40 | 23:50 | TOTAL DAILY WORKLOAD |
|---|---|---|---|---|---|---|---|---|
| 10-MINUTE WORKLOAD | 1.3 | 1.8 | 2.9 | ... | 3.3 | 2.3 | 1.6 | 30.8 |
| WORKLOAD RATIO PER 10-MINUTES | 1.3/30.8=0.0422 | 1.8/30.8=0.0584 | 2.9/30.8=0.0942 | ... | 3.3/30.8=0.1071 | 2.3/30.8=0.0747 | 1.6/30.8=0.0519 | |
| | | | | | | | | |
| WEEK 1 WEDNESDAY OF 2023 Q4 | 00:10 | 00:20 | 00:30 | ... | 23:30 | 23:40 | 23:50 | TOTAL DAILY WORKLOAD |
| 10-MINUTE WORKLOAD | 0.6 | 3.1 | 2.7 | ... | 1.4 | 5.3 | 3.5 | 33.4 |
| WORKLOAD RATIO PER 10-MINUTES | 0.6/33.4=0.0018 | 3.1/33.4=0.0928 | 2.7/33.4=0.0808 | ... | 1.4/33.4=0.0419 | 5.3/33.4=0.1587 | 3.5/33.4=0.1048 | |
| | | | | | | | | |
| WEEK 1 WEDNESDAY OF 2024 Q1 | 00:10 | 00:20 | 00:30 | ... | 23:30 | 23:40 | 23:50 | TOTAL DAILY WORKLOAD |
| 10-MINUTE WORKLOAD | 2.8 | 3 | 2.5 | ... | 5.7 | 3.9 | 0.4 | 36.9 |
| WORKLOAD RATIO PER 10-MINUTES | 2.8/36.9=0.0759 | 3.0/36.9=0.0813 | 2.5/36.9=0.0678 | ... | 5.7/36.9=0.1545 | 3.9/36.9=0.1057 | 0.4/36.9=0.0108 | |
| | | | | | | | | |
| AVERAGE WORKLOAD RATIO PER 10-MINUTES | 0.0422+0.0018+0.0759/3=0.0399 | 0.0584+0.0928+0.0813/3=0.0775 | 0.0942+0.0808+0.0678/3=0.0809 | ... | 0.1071+0.0419+0.1545/3=0.1012 | 0.0747+0.1587+0.1057/3=0.1130 | 0.0519+0.1048+0.0108/3=0.0558 | ... |

FIG. 5

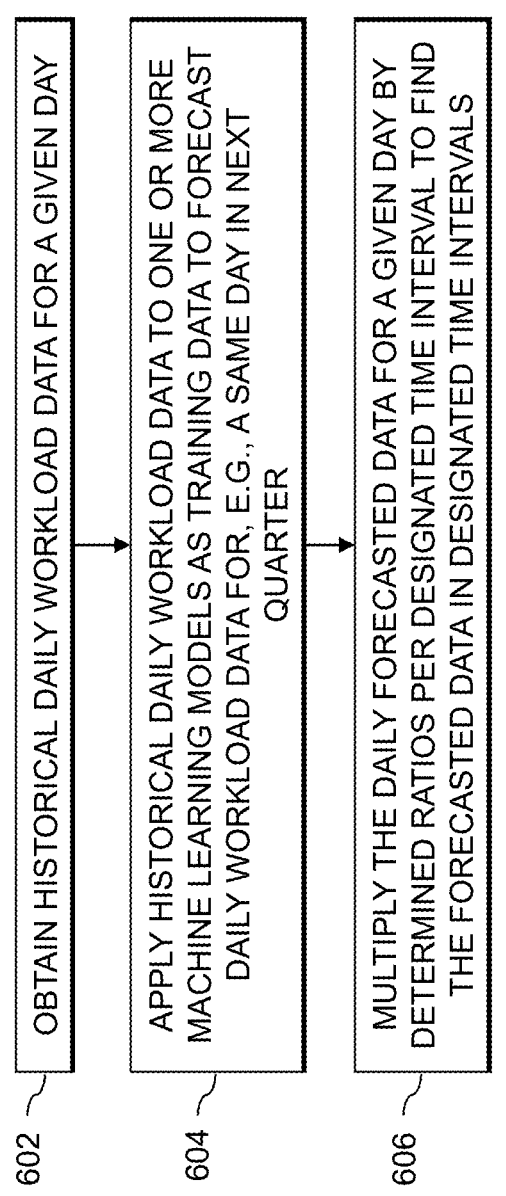

602 — OBTAIN HISTORICAL DAILY WORKLOAD DATA FOR A GIVEN DAY

604 — APPLY HISTORICAL DAILY WORKLOAD DATA TO ONE OR MORE MACHINE LEARNING MODELS AS TRAINING DATA TO FORECAST DAILY WORKLOAD DATA FOR, E.G., A SAME DAY IN NEXT QUARTER

606 — MULTIPLY THE DAILY FORECASTED DATA FOR A GIVEN DAY BY DETERMINED RATIOS PER DESIGNATED TIME INTERVAL TO FIND THE FORECASTED DATA IN DESIGNATED TIME INTERVALS

FIG. 6

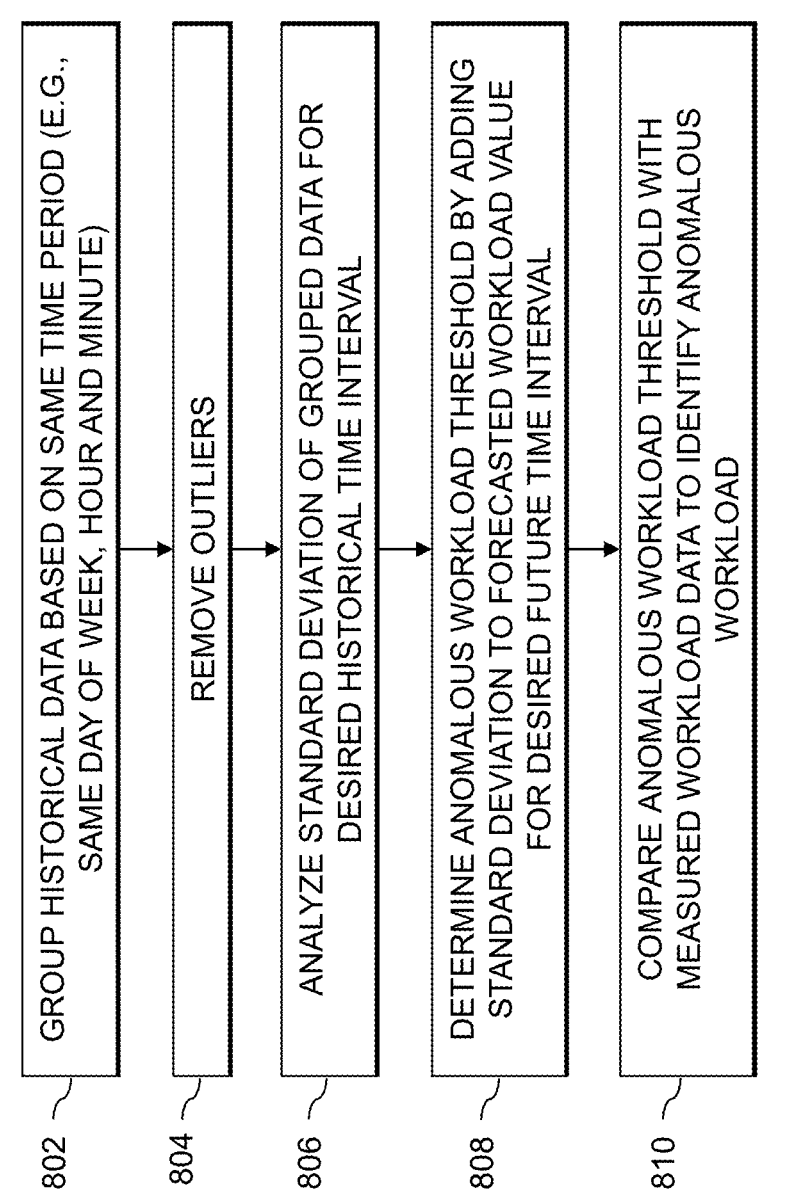

802 GROUP HISTORICAL DATA BASED ON SAME TIME PERIOD (E.G., SAME DAY OF WEEK, HOUR AND MINUTE)

804 REMOVE OUTLIERS

806 ANALYZE STANDARD DEVIATION OF GROUPED DATA FOR DESIRED HISTORICAL TIME INTERVAL

808 DETERMINE ANOMALOUS WORKLOAD THRESHOLD BY ADDING STANDARD DEVIATION TO FORECASTED WORKLOAD VALUE FOR DESIRED FUTURE TIME INTERVAL

810 COMPARE ANOMALOUS WORKLOAD THRESHOLD WITH MEASURED WORKLOAD DATA TO IDENTIFY ANOMALOUS WORKLOAD

FIG. 8

|  | 00:10 | 00:20 | 00:30 | ... |
|---|---|---|---|---|
| 10-MINUTE WORKLOAD FOR WEEK 1 WEDNESDAY OF 2023 Q3 | 1.3 | 1.8 | 2.9 | ... |
| 10-MINUTE WORKLOAD FOR WEEK 1 WEDNESDAY OF 2023 Q4 | 0.6 | 3.1 | 2.7 | ... |
| 10-MINUTE WORKLOAD FOR WEEK 1 WEDNESDAY OF 2024 Q1 | 2.8 | 3 | 2.5 | ... |
|  |  |  |  |  |
| STANDARD DEVIATION OF 10-MINUTE WORKLOAD: | 1.12 | 0.72 | 0.2 | ... |
|  |  |  |  |  |
| FORECASTED 10-MINUTE WORKLOAD FOR WEEK 1 WEDNESDAY OF 2024 Q2 | 1.4 | 2.7 | 2.8 | ... |
|  |  |  |  |  |
| ANOMALOUS WORKLOAD THRESHOLD (E.G., SUM OF STANDARD DEVIATION AND FORECASTED 10-MINUTE WORKLOAD) | 2.52 | 3.42 | 3.0 | ... |
|  |  |  |  |  |
| MEASURED 10-MINUTE WORKLOAD DATA FOR WEEK 1 WEDNESDAY OF 2024 Q2 | 5.3 | 2.6 | 2.9 | ... |
|  |  |  |  |  |
| ANOMALY CLASSIFICATION | ANOMALY | NORMAL | NORMAL | ... |

FIG. 9

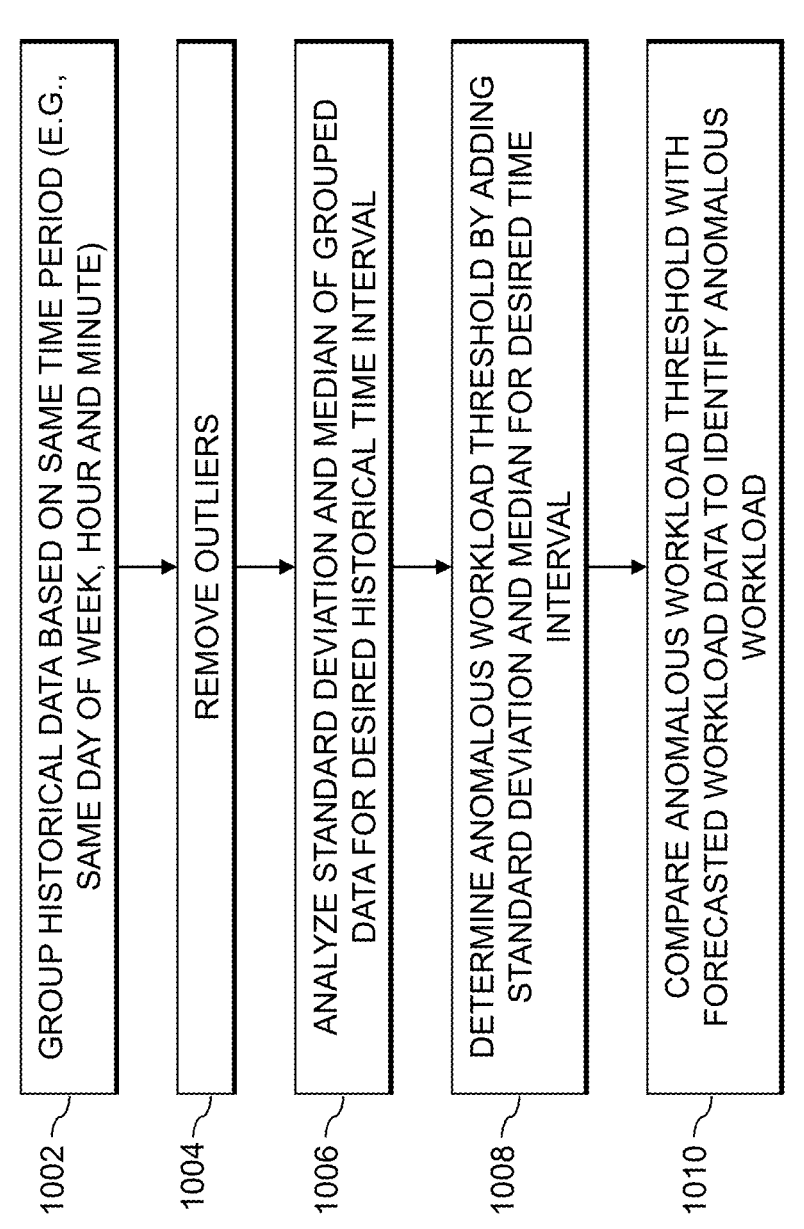

1002 GROUP HISTORICAL DATA BASED ON SAME TIME PERIOD (E.G., SAME DAY OF WEEK, HOUR AND MINUTE)

1004 REMOVE OUTLIERS

1006 ANALYZE STANDARD DEVIATION AND MEDIAN OF GROUPED DATA FOR DESIRED HISTORICAL TIME INTERVAL

1008 DETERMINE ANOMALOUS WORKLOAD THRESHOLD BY ADDING STANDARD DEVIATION AND MEDIAN FOR DESIRED TIME INTERVAL

1010 COMPARE ANOMALOUS WORKLOAD THRESHOLD WITH FORECASTED WORKLOAD DATA TO IDENTIFY ANOMALOUS WORKLOAD

FIG. 10

| | 00:10 | 00:20 | 00:30 | | ⋮ |
|---|---|---|---|---|---|
| 10-MINUTE WORKLOAD FOR WEEK 1 WEDNESDAY OF 2023 Q3 | 1.3 | 1.8 | 2.9 | | ⋮ |
| 10-MINUTE WORKLOAD FOR WEEK 1 WEDNESDAY OF 2023 Q4 | 0.6 | 3.1 | 2.7 | | ⋮ |
| 10-MINUTE WORKLOAD FOR WEEK 1 WEDNESDAY OF 2024 Q1 | 2.8 | 3 | 2.5 | | ⋮ |
| 10-MINUTE WORKLOAD DATA FOR WEEK 1 WEDNESDAY OF 2024 Q2 | 5.3 | 2.6 | 2.9 | | ⋮ |
| | | | | | |
| STANDARD DEVIATION OF 10-MINUTE WORKLOAD: | 2.08 | 0.59 | 0.19 | | ⋮ |
| MEDIAN OF 10-MINUTE WORKLOAD: | 2.05 | 2.8 | 2.8 | | |
| | | | | | |
| ANOMALOUS WORKLOAD THRESHOLD (SUM OF STANDARD DEVIATION AND MEDIAN) | 4.13 | 3.39 | 2.99 | | ⋮ |
| | | | | | |
| FORECASTED 10-MINUTE WORKLOAD DATA FOR WEEK 1 WEDNESDAY OF 2024 Q3 | 5.6 | 2.2 | 2.75 | | ⋮ |
| ANOMALY CLASSIFICATION | ANOMALY | NORMAL | NORMAL | | ⋮ |

FIG. 11

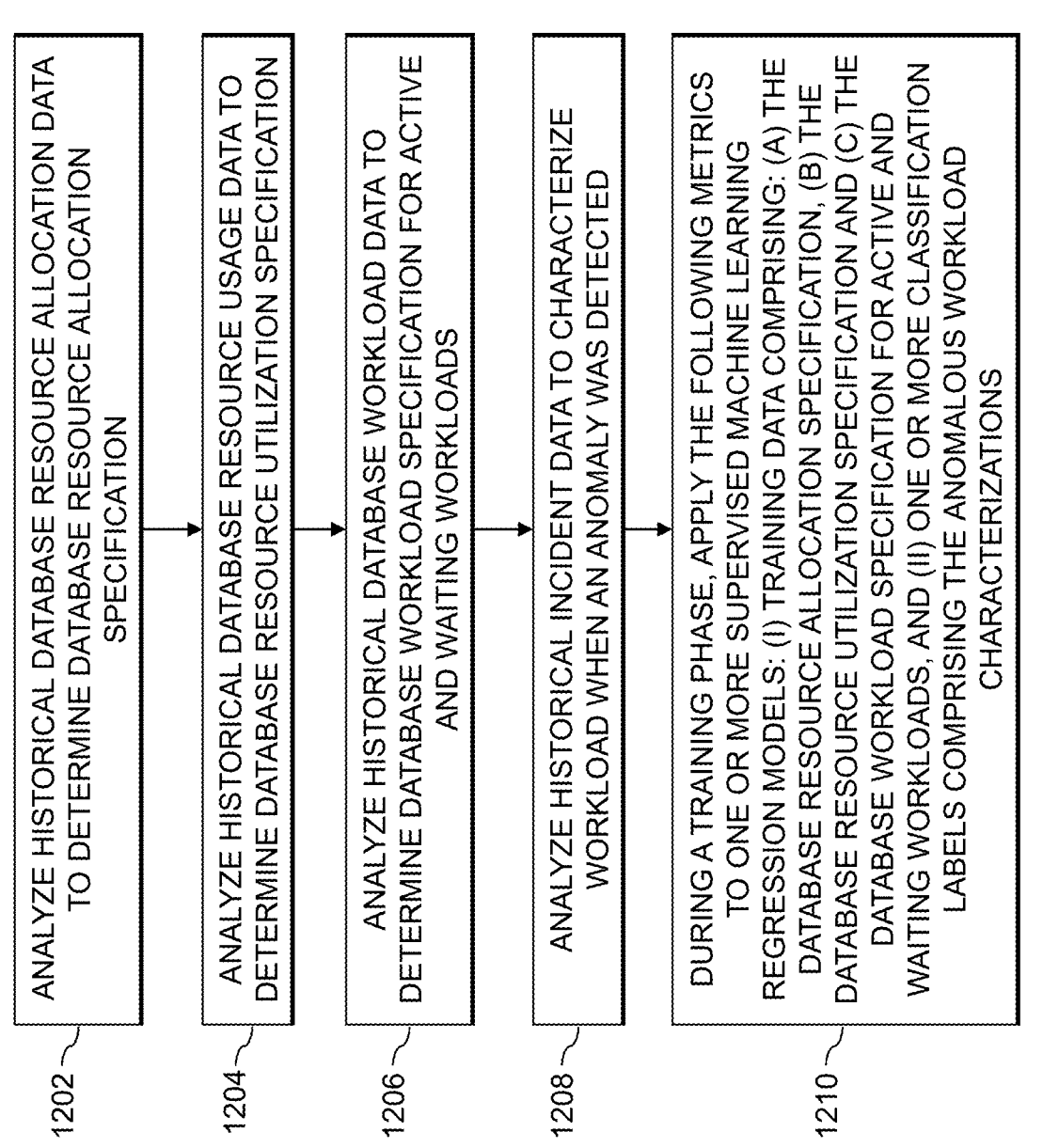

1202 — ANALYZE HISTORICAL DATABASE RESOURCE ALLOCATION DATA TO DETERMINE DATABASE RESOURCE ALLOCATION SPECIFICATION

1204 — ANALYZE HISTORICAL DATABASE RESOURCE USAGE DATA TO DETERMINE DATABASE RESOURCE UTILIZATION SPECIFICATION

1206 — ANALYZE HISTORICAL DATABASE WORKLOAD DATA TO DETERMINE DATABASE WORKLOAD SPECIFICATION FOR ACTIVE AND WAITING WORKLOADS

1208 — ANALYZE HISTORICAL INCIDENT DATA TO CHARACTERIZE WORKLOAD WHEN AN ANOMALY WAS DETECTED

1210 — DURING A TRAINING PHASE, APPLY THE FOLLOWING METRICS TO ONE OR MORE SUPERVISED MACHINE LEARNING REGRESSION MODELS: (I) TRAINING DATA COMPRISING: (A) THE DATABASE RESOURCE ALLOCATION SPECIFICATION, (B) THE DATABASE RESOURCE UTILIZATION SPECIFICATION AND (C) THE DATABASE WORKLOAD SPECIFICATION FOR ACTIVE AND WAITING WORKLOADS, AND (II) ONE OR MORE CLASSIFICATION LABELS COMPRISING THE ANOMALOUS WORKLOAD CHARACTERIZATIONS

FIG. 12

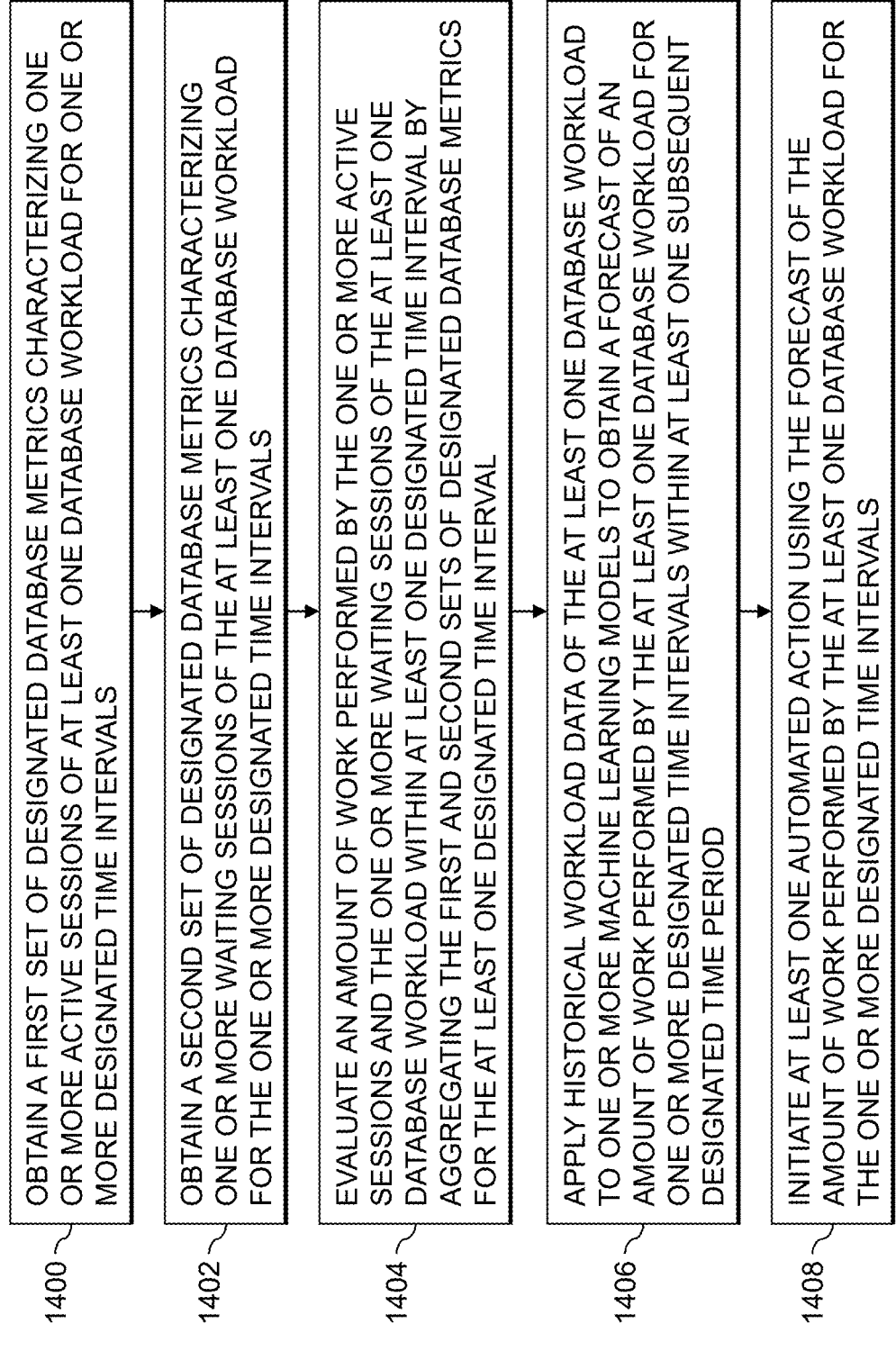

1400 — OBTAIN A FIRST SET OF DESIGNATED DATABASE METRICS CHARACTERIZING ONE OR MORE ACTIVE SESSIONS OF AT LEAST ONE DATABASE WORKLOAD FOR ONE OR MORE DESIGNATED TIME INTERVALS

1402 — OBTAIN A SECOND SET OF DESIGNATED DATABASE METRICS CHARACTERIZING ONE OR MORE WAITING SESSIONS OF THE AT LEAST ONE DATABASE WORKLOAD FOR THE ONE OR MORE DESIGNATED TIME INTERVALS

1404 — EVALUATE AN AMOUNT OF WORK PERFORMED BY THE ONE OR MORE ACTIVE SESSIONS AND THE ONE OR MORE WAITING SESSIONS OF THE AT LEAST ONE DATABASE WORKLOAD WITHIN AT LEAST ONE DESIGNATED TIME INTERVAL BY AGGREGATING THE FIRST AND SECOND SETS OF DESIGNATED DATABASE METRICS FOR THE AT LEAST ONE DESIGNATED TIME INTERVAL

1406 — APPLY HISTORICAL WORKLOAD DATA OF THE AT LEAST ONE DATABASE WORKLOAD TO ONE OR MORE MACHINE LEARNING MODELS TO OBTAIN A FORECAST OF AN AMOUNT OF WORK PERFORMED BY THE AT LEAST ONE DATABASE WORKLOAD FOR ONE OR MORE DESIGNATED TIME INTERVALS WITHIN AT LEAST ONE SUBSEQUENT DESIGNATED TIME PERIOD

1408 — INITIATE AT LEAST ONE AUTOMATED ACTION USING THE FORECAST OF THE AMOUNT OF WORK PERFORMED BY THE AT LEAST ONE DATABASE WORKLOAD FOR THE ONE OR MORE DESIGNATED TIME INTERVALS

FIG. 14

DATABASE CONTROL USING MACHINE LEARNING BASED PREDICTION

BACKGROUND

A database system may be characterized by one or more database workloads that may comprise queries performed against a database and other operations. The database workload represents the demand placed on the database system by operations such as reading data, writing data, updating data and querying the data.

SUMMARY

Illustrative embodiments of the disclosure provide techniques for database control using machine learning based prediction. An exemplary method includes obtaining a first set of designated database metrics characterizing one or more active sessions of at least one database workload for one or more designated time intervals; obtaining a second set of designated database metrics characterizing one or more waiting sessions of the at least one database workload for the one or more designated time intervals; evaluating an amount of work performed by the one or more active sessions and the one or more waiting sessions of the at least one database workload within at least one designated time interval by aggregating the first and second sets of designated database metrics for the at least one designated time interval; applying historical workload data of the at least one database workload to one or more machine learning models to obtain a forecast of an amount of work performed by the at least one database workload for one or more designated time intervals within at least one subsequent designated time period; and initiating at least one automated action using the forecast of the amount of work performed by the at least one database workload for the one or more designated time intervals.

Illustrative embodiments can provide significant advantages relative to conventional techniques. For example, technical problems associated with conventional techniques are mitigated in one or more embodiments by automatically characterizing an amount of work performed by a database workload using various metrics of active and waiting sessions of the database workload.

These and other illustrative embodiments described herein include, without limitation, methods, apparatus, systems, and computer program products comprising processor-readable storage media.

BRIEF DESCRIPTION OF THE DRAWINGS

FIG. 4 is a flow diagram illustrating an exemplary implementation of an average workload ratio determination process for one or more designated time intervals in accordance with an illustrative embodiment;

FIG. 5 illustrates an example of the average workload ratio determination process of FIG. 4 in accordance with an illustrative embodiment;

FIG. 6 is a flow diagram illustrating an exemplary implementation of a process for forecasting a workload for one or more designated time intervals in accordance with an illustrative embodiment;

FIG. 8 is a flow diagram illustrating an exemplary implementation of a process for determining dynamic thresholds for anomaly detection with respect to measured data in accordance with an illustrative embodiment;

FIG. 9 illustrates an example of the dynamic anomaly threshold process of FIG. 8 in accordance with an illustrative embodiment;

FIG. 10 is a flow diagram illustrating an exemplary implementation of a process for determining dynamic thresholds for anomaly detection with respect to forecasted data in accordance with an illustrative embodiment;

FIG. 11 illustrates an example of the dynamic anomaly threshold process of FIG. 8 in accordance with an illustrative embodiment;

FIG. 12 is a flow diagram illustrating an exemplary implementation of a training process for a supervised machine learning regression model that predicts a database performance breaking point in accordance with an illustrative embodiment;

FIG. 14 is a flow diagram illustrating an exemplary implementation of a method for database control using machine learning based prediction, according to one or more embodiments of the disclosure;

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Existing database workload forecasts are typically based on query arrival rates and/or utilization of host system resources, such as compute, memory and network resources. One or more aspects of the disclosure recognize, however, that a database workload may be at a peak while the utilization of the host system resources may be at normal levels.

In one or more embodiments, database control techniques are provided that use machine learning-based predictions by considering various designated metrics of active and waiting sessions of a database workload, as discussed further below in conjunction with FIGS. 3A and 3B, for example. A database workload may be expressed in some embodiments as a ratio (or another characterization) of a change in total time spent for the various designated metrics of the active and waiting sessions of the database workload at designated time intervals.

Figure 1:
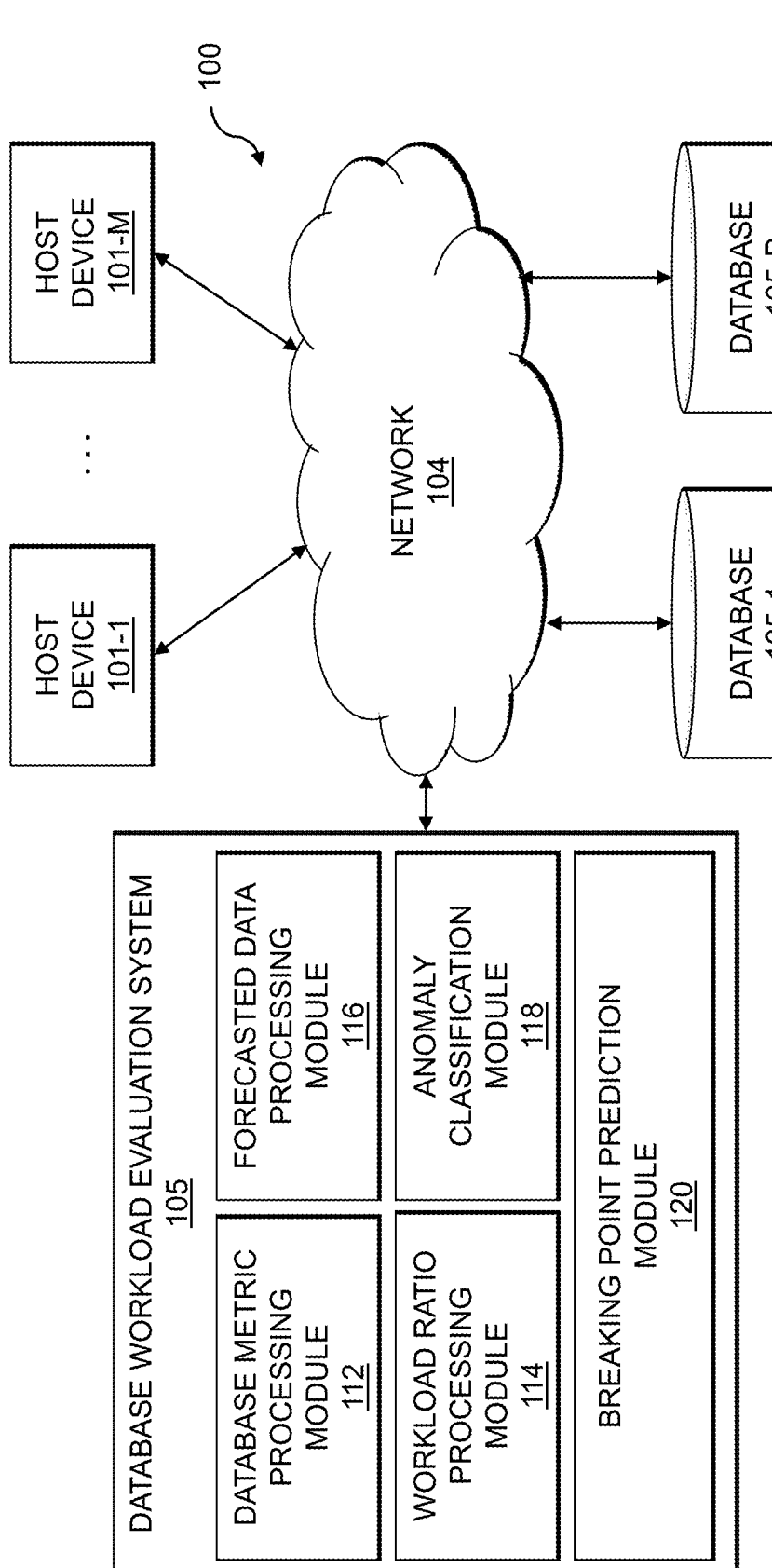
FIG. 1 illustrates a network computing environment that can be configured for database control using machine learning based prediction in accordance with an illustrative embodiment.

FIG. 1 shows an information processing system 100 configured for database workload prediction in accordance with an illustrative embodiment. The information processing system 100 comprises a plurality of host devices 101-1, . . . 101-M (collectively referred to herein as host devices 101) and a plurality of databases 125-1, . . . 125-P (collectively referred to herein as databases 125). The information processing system 100 of FIG. 1 also comprises a database workload evaluation system 105. The host devices 101 are configured to communicate with the databases 125 and/or the database workload evaluation system 105 over a network 104.

The host devices 101 illustratively comprise servers or other types of computers of an enterprise computer system, cloud-based computer system or other arrangement of multiple compute nodes associated with respective users.

For example, the host devices 101 in some embodiments illustratively provide compute services such as execution of one or more applications on behalf of each of one or more users associated with respective ones of the host devices. Such applications illustratively generate one or more database operations, such as performing database queries, reading data, writing data and updating data, that are processed by one or more of the databases 125.

The host devices 101 and the database workload evaluation system 105 may be implemented on a common processing platform, or on separate processing platforms. The host devices 101 are illustratively configured to generate one or more database operations that are processed by one or more of the databases 125.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using IP or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The database workload evaluation system 105 includes a database metric processing module 112, a workload ratio processing module 114, a forecasted data processing module 116, an anomaly classification module 118 and a breaking point prediction module 120 that facilitate the prediction of database workloads, as described in more detail elsewhere herein.

Generally, the database metric processing module 112 includes functionality to measure workloads, as discussed further below in conjunction with FIGS. 2, 3A and 3B, for example. The workload ratio processing module 114, in some embodiments, can determine workload ratios for each designated time interval relative to a total daily workload, for example, and averages of determined workload ratios for the designated time intervals over time, as discussed further below in conjunction with FIGS. 4 and 5, for example. The forecasted data processing module 116 can determine forecasted data in designated time intervals, as discussed further below in conjunction with FIGS. 6 and 7, for example.

In some embodiments, the anomaly classification module 118 determines anomalous workload thresholds for both measured and forecasted workload data, and uses the determined workload thresholds to identify anomalous workloads, as discussed further below in conjunction with FIGS. 8 through 11, for example. The breaking point prediction module 120 may train a supervised machine learning regression model that predicts a database performance breaking point, as discussed further below in conjunction with FIGS. 12 and 13, for example.

The database workload evaluation system 105 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101 may be implemented in whole or in part on the same processing platform as the database workload evaluation system 105, or on a separate processing platform.

It is to be appreciated that this particular arrangement of elements 112, 114, 116, 118 and 120 illustrated in the database workload evaluation system 105 of the FIG. 1 embodiment is presented by way of example only, and alternative arrangements can be used in other embodiments. For example, the functionality associated with the elements 112, 114, 116, 118 and 120 in other embodiments can be combined into a single element, or separated across a larger number of elements. As another example, multiple distinct processors can be used to implement different ones of the elements 112, 114, 116, 118 and 120 or portions thereof.

At least portions of elements 112, 114, 116, 118 and 120 may be implemented at least in part in the form of software that is stored in memory and executed by a processor.

It is to be understood that the particular set of elements shown in FIG. 1 for the database workload evaluation system 105 of information processing system 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, the database workload evaluation system 105 and one or more of the databases 125 can be on and/or part of the same processing platform.

An exemplary process utilizing elements 112, 114, 116, 118 and 120 of an example database workload evaluation system 105 in information processing system 100 will be described in more detail with reference to, for example, the flow diagrams of FIGS. 4, 6, 8, 10, 12 and 14.

The database workload evaluation system 105 can have at least one associated database 125 configured to store data pertaining to, for example, workloads, database metrics, workload forecasts and/or execution logs associated with one or more databases. An example database 125 can be implemented using one or more storage systems associated with the database workload evaluation system 105. Such storage systems can comprise any of a variety of different types of storage including network-attached storage (NAS), storage area networks (SANs), direct-attached storage (DAS) and distributed DAS, as well as combinations of these and other storage types, including software-defined storage. In addition, one or more workloads associated with a given database 125 may be evaluated using the disclosed database workload prediction techniques.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the host devices 101, the database workload evaluation system 105 and one or more of the databases 125 to reside in different data centers. Numerous other distributed implementations of the host devices 101, the database workload evaluation system 105 and the databases 125 are possible.

Additional examples of processing platforms utilized to implement the host devices 101, the database workload evaluation system 105 and the databases 125 in illustrative embodiments will be described in more detail below in conjunction with, for example, FIGS. 15 and 16.

It is to be appreciated that these and other features of illustrative embodiments are presented by way of example only, and should not be construed as limiting in any way.

Accordingly, different numbers, types and arrangements of system components such as the host devices 101, the databases 125, the database workload evaluation system 105, and the network 104 can be used in other embodiments.

It should be understood that the particular sets of modules and other components implemented in the information processing system 100 as illustrated in FIG. 1 are presented by way of example only. In other embodiments, only subsets of these components, or additional or alternative sets of components, may be used, and such components may exhibit alternative functionality and configurations.

Figure 2:
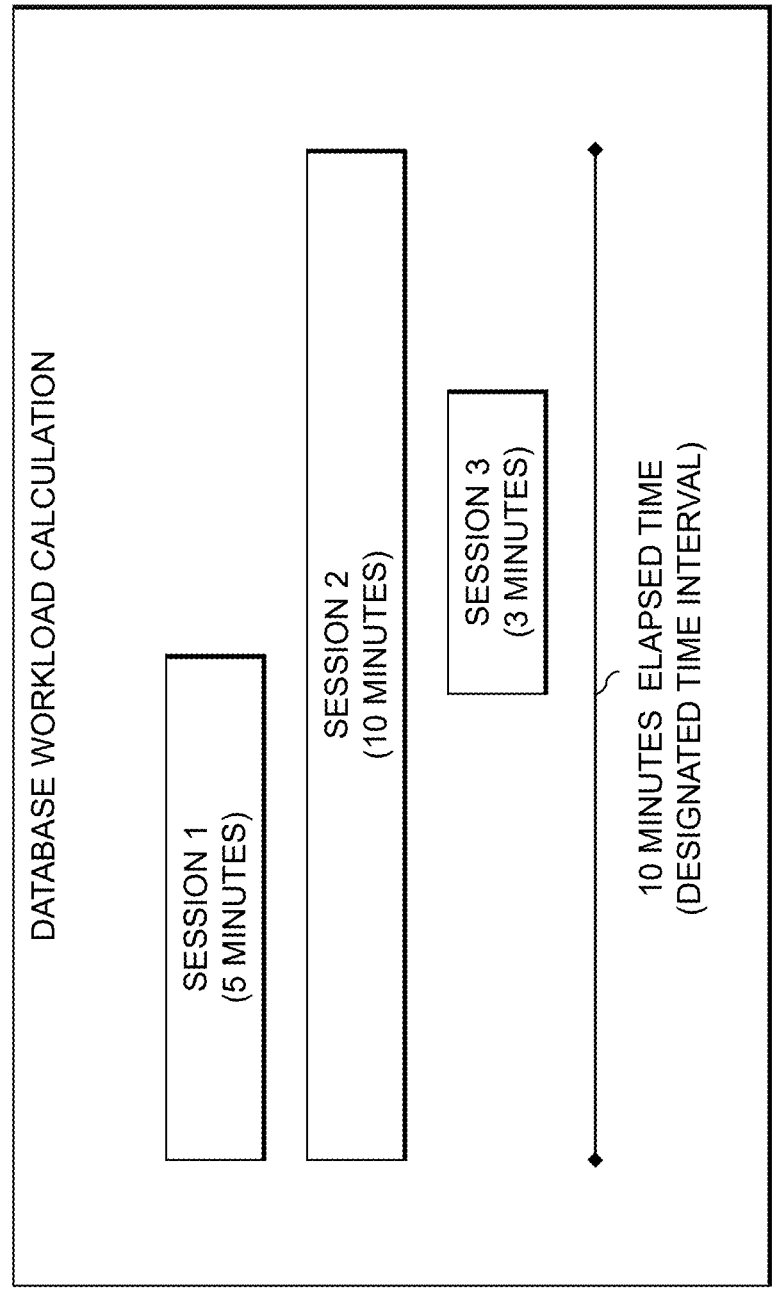
FIG. 2 illustrates an example of a calculation of an amount of work performed by a database workload in accordance with an illustrative embodiment.

FIG. 2 illustrates an example of a calculation of an amount of work performed by a database workload in accordance with an illustrative embodiment. A database workload may be considered as a series of sessions that comprise one or more database transactions. As noted above, one or more embodiments of the disclosure determine an amount of work performed by a database workload based on various metrics of active and waiting sessions of a given database workload. As discussed further below in conjunction with FIGS. 3A and 3B, a first set of designated database metrics is considered to characterize active sessions of a database workload and a second set of designated database metrics is considered to characterize waiting sessions of the database workload.

In at least some embodiments, a database workload may be characterized as a ratio (or another characterization) of the change in total time spent by the database metrics for the active and waiting sessions of the database workload for a given designated time interval, relative to the designated time interval, as follows:

$$\text{Database Workload} = \frac{\text{Change in Total Time Spent by Active and Waiting Database Metrics}}{\text{Designated Time Interval}}.$$

In the examples discussed herein, the designated time interval is assumed to be 10 minutes of elapsed time, but other time intervals may be employed in other embodiments. In the example of FIG. 2, a first session of a database workload completes in five minutes, based on an aggregation of the first and second sets of designated database metrics. Similarly, a second session of the database workload completes in 10 minutes, and the third session of the database workload completes in three minutes. As shown in FIG. 2, two or more sessions may overlap within portions of the designated time interval. Thus, the database workload may be expressed, as follows:

$$\text{Database Workload} = \frac{5 + 10 + 3 \text{ minutes}}{10 \text{ minutes}} = 1.8.$$

Figure 3B:
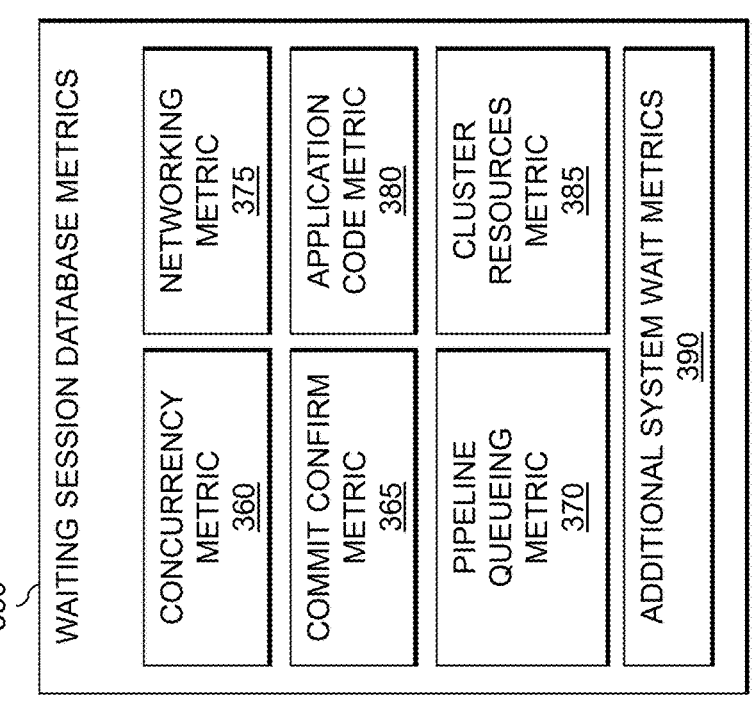
FIGS. 3A and 3B illustrate examples of a first set of database metrics for an active workload session and a second set of database metrics for a waiting workload session, respectively, in accordance with an illustrative embodiment.
Figure 3A:
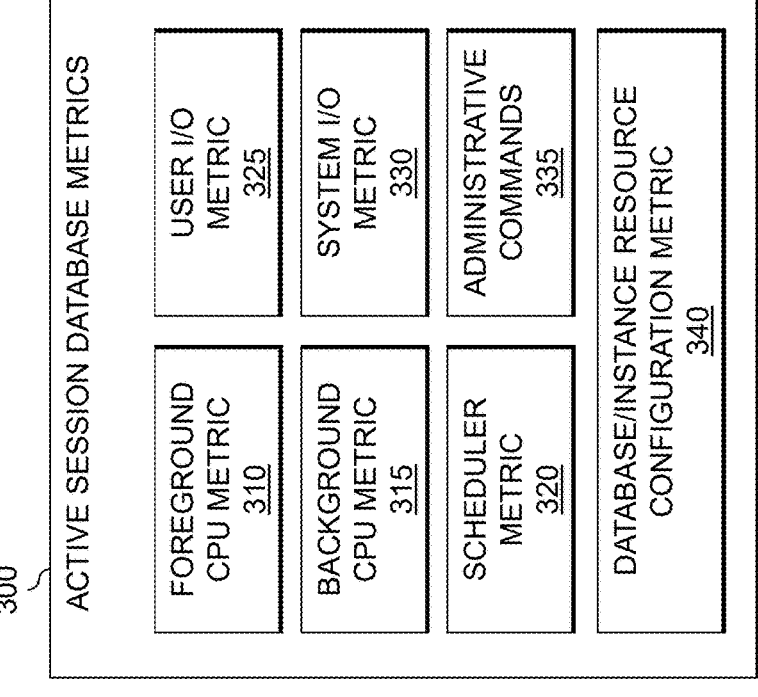

FIGS. 3A and 3B illustrate examples of a first set of database metrics for an active workload session and a second set of database metrics for a waiting workload session, respectively, in accordance with an illustrative embodiment. Generally, as used herein, an active workload session indicates the utilization of database resources for performing one or more database operations, such as performing database queries, reading data, writing data and updating data, while a waiting workload session signifies that the workload must wait for a specific event (including time-based events) to happen before the waiting workload session can proceed. The various sessions of a given workload are thus categorized as: (i) an active workload session or (ii) a waiting (e.g., inactive) workload session. As noted above, a first set of designated database metrics is considered to characterize active sessions of a database workload and a second set of designated database metrics is considered to characterize waiting sessions of the database workload.

In the example of FIG. 3A, active sessions of a database workload are characterized using a first set 300 of designated database metrics. In particular, active sessions of a database workload are characterized by a foreground CPU metric 310, a background CPU metric 315, a scheduler metric 320, a user input/output (I/O) metric 325, a system I/O metric 330, an administrative commands metric 335 and a database/instance resource configuration metric 340.

In at least some embodiments, the foreground CPU metric 310 may correspond to one or more events for which the active session consumes processing resources (e.g., server CPU resources, for example, when committing a query). The background CPU metric 315 may correspond to one or more events for which the active session consumes one or more server CPU background processes (e.g., monitors all mounted databases). The scheduler metric 320 may correspond to one or more events related to a database job scheduler. The user I/O metric 325 may correspond to one or more events related to throughput or I/O operations. The system I/O metric 330 may correspond to one or more events related to one or more background I/O processes of the system. The administrative commands metric 335 may correspond to one or more events related to database administrator commands. The database/instance resource configuration metric 340 may correspond to one or more events related to the database resources configuration.

In the example of FIG. 3B, waiting sessions of a database workload are characterized by a second set 350 of designated database metrics. In particular, waiting sessions of a database workload are characterized by a concurrency metric 360, a commit confirmation metric 365, a pipeline queueing metric 370, a networking metric 375, an application code metric 380, a cluster resources metric 385 and additional system wait metrics 390.

In at least some embodiments, the concurrency metric 360 may correspond to one or more events where a workload waits for one or more internal resources of a given database. The commit confirmation metric 365 may correspond to one or more events where a workload waits for one or more confirmations after a commit. The pipeline queueing metric 370 may correspond to one or more events where a workload waits for one or more delays in getting data in a pipeline environment. The networking metric 375 may correspond to one or more events where a workload waits for one or more network messages. The application code metric 380 may correspond to one or more events where a workload waits for one or more codes from an application user. The cluster resources metric 385 may correspond to one or more events where a workload waits for one or more cluster resources. The additional system wait metrics 390 may correspond to one or more events where a workload waits for one or more unusual events, which should not typically occur on a system.

FIG. 4 is a flow diagram illustrating an exemplary implementation of an average workload ratio (or another characterization) determination process for one or more designated time intervals in accordance with an illustrative embodiment. The process of FIG. 4 determines a database workload as the ratio of the change in total time spent by the designated database metrics for active and waiting sessions relative to the designated time interval.

In one or more embodiments, the historical data based on the designated time interval is first converted to a daily basis, for example. Once the future daily workload is forecasted, the forecasted data is then converted to the designated time interval basis by evaluating the database workload in each designated time interval (e.g., in 10 minutes) relative to the sum of the workload in a day, as follows:

$$\text{Workload Ratio} = \frac{\text{Database Workload in Designated Time Intervals}}{\text{Total Database Workload in the Day}}$$

In at least one embodiment, the historical data is analyzed to gain insights on seasonal trends and/or patterns. One or more aspects of the disclosure recognize that the database workload can be affected by the number of weeks in a fiscal quarter, the day of a week, and the day of the fiscal quarter or holiday season period, for example. The historical workload data having the same seasonal factors can be grouped together, so that the ratio (or another characterization) of average workload in the designated time interval relative to the total workload in the day can be determined. Thus, the average ratio of each designated time interval is determined in some embodiments for the same time period (e.g., a same seasonal week in a fiscal quarter, a same day of the week, and/or a same hour and minute).

In the example of FIG. 4, historical workload data is obtained in step 402. The historical workload data is processed in step 404 to determine a total daily workload for each day and in step 406 to determine the intra-day workload for each designated time interval (e.g., 10 minutes) within each day.

A workload ratio (or another characterization) is determined in step 408 for each designated time interval relative to a total daily workload, as discussed further below in conjunction with FIG. 5. Finally, an average of the determined workload ratios for the designated time intervals over time (e.g., a given time on the same day of each fiscal quarter or each season) (or another characterization) is determined in step 410.

FIG. 5 illustrates an example of the average workload ratio determination process of FIG. 4 in accordance with an illustrative embodiment. In the example of FIG. 5, a designated time interval of ten minutes is employed. Historical database workload data and workload ratios are presented in FIG. 5 for ten-minute intervals associated with Wednesdays in the first week of the following quarters: Q3 and Q4 in 2023 and Q1 in 2024. In addition, the table of FIG. 5 also sums the historical database workload data for the ten-minute intervals in a day to determine the total daily workload in the final column of FIG. 5.

The table of FIG. 5 also computes an average database workload ratio for the ten-minute intervals in a day in the final row of FIG. 5 by summing the historical database workload data for the respective ten-minute interval and dividing the sum by the number of data entries (e.g., three data entries).

The average database workload ratios are then used to be multiplied with forecasted daily database workload data to find the forecasted data for a designated time interval (e.g., ten minute) basis, as discussed further below in conjunction with FIGS. 6 and 7. The accuracy of the forecasted data will be increased by considering the seasonal factors and trends.

FIG. 6 is a flow diagram illustrating an exemplary implementation of a process for forecasting a workload for one or more designated time intervals in accordance with an illustrative embodiment. In the example of FIG. 6, forecasted daily database workload data is converted to the designated time interval basis. Historical daily workload data for a given day is obtained in step 602 and the historical daily workload data is applied in step 604 to one or more machine learning models as training data to forecast daily workload data for a same day in the next quarter (or each season), for example. The daily forecasted data for a given day is multiplied in step 606 by determined ratios for the designated time interval (e.g., from FIG. 5) to find the forecasted data in the designated time intervals.

Figure 7:
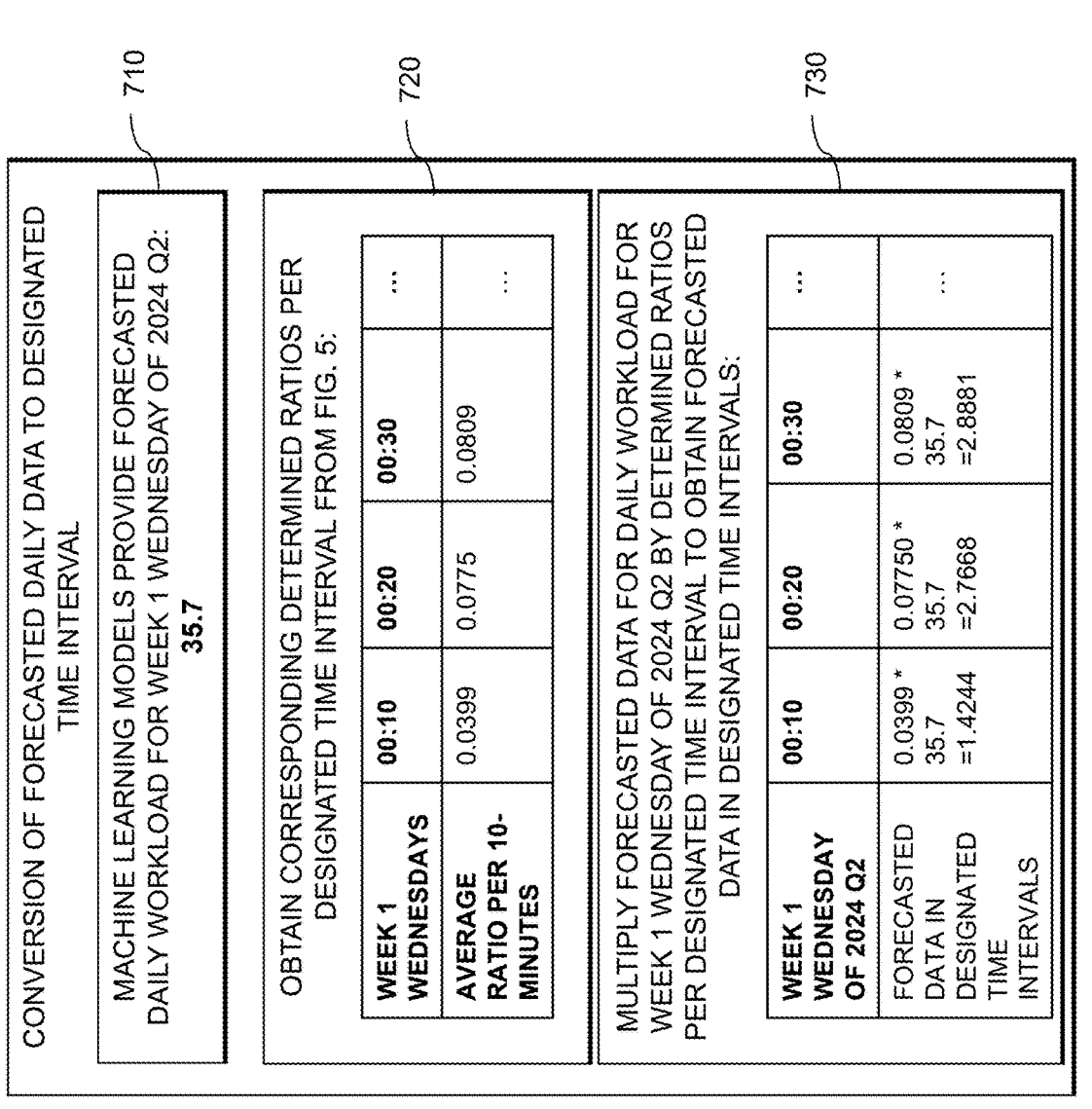
FIG. 7 illustrates an example of the workload forecast process of FIG. 5 in accordance with an illustrative embodiment.

FIG. 7 illustrates an example of the workload forecast process of FIG. 5 in accordance with an illustrative embodiment. In the example of FIG. 7, a forecasted database workload is determined for a future date (e.g., a given day of a given week in a given future quarter or future season) based on historical data associated with the same time period (e.g., the same day of the week in one or more prior quarters or prior seasons).

As shown in FIG. 7, one or more machine learning models provide a forecasted daily database workload in step 710 for a future date (such as a Wednesday in week 1 of the second quarter of 2024). The corresponding determined workload ratios per designated time interval are obtained in step 720 from the final row of the exemplary table of FIG. 5. Finally, the forecasted data for the daily workload for the future date (e.g., a week 1 Wednesday of the second quarter of 2024) is multiplied in step 730 by the determined workload ratios per designated time interval, in order to obtain forecasted data in the designated time intervals, as shown at the bottom of FIG. 7.

One or more aspects of the disclosure recognize that comparing an average threshold value to a workload value at different periods of time is not sufficient. Therefore, in one or more embodiments, a dynamic threshold value is determined for a point in time and compared with the workload value derived at a same point in time. In some embodiments, as discussed further below, the historical database workload data is grouped based on the same time period (with same day of week, hour, and minute, relative to a fiscal quarter or a season) and the standard deviation (or another tolerance band) of the grouped data is analyzed for each designated time interval. These standard deviation values are added to the historically predicted value for each designated time interval to obtain a dynamic threshold for a running (e.g., measured) workload at the same point in time. If the measured workload exceeds the dynamic threshold value, it is detected as an anomaly or spike, serving as a guideline to a database administrator as to whether or not the running workload is abnormal during a root cause analysis of an incident, for example. In addition, the standard deviation value is added to a median of the historical workload data for each designated time interval, marking the dynamic threshold for a future workload at the same point in time. If the forecasted database workload exceeds the threshold, a spike or other anomaly is predicted, allowing the database administrator to proactively monitor the database and reschedule the jobs that were initially planned to prevent database congestion.

FIG. 8 is a flow diagram illustrating an exemplary implementation of a process for determining dynamic thresholds for anomaly detection with respect to measured data in accordance with an illustrative embodiment. A standard deviation is determined for each designated time interval so that the standard deviation can be used to determine dynamic thresholds for detecting anomalies with respect to both historical and running workloads.

In the example of FIG. 8, historical data is grouped in step 802 based on a same time period (e.g., a same day of week, hour and minute for one or more consecutive fiscal quarters or seasons, for example). In step 804, one or more outliers are removed. A standard deviation (or another tolerance band) of the grouped data is analyzed in step 806 for the desired historical time interval, as discussed further below in conjunction with FIG. 9. In step 808, an anomalous workload threshold is determined by adding the standard deviation to the forecasted workload value for the desired time interval. In step 810, the anomalous workload threshold is compared with the measured (e.g., actual) workload data to identify an anomalous workload (e.g., for one or more designated time intervals).

FIG. 9 illustrates an example of the dynamic anomaly threshold process of FIG. 8 in accordance with an illustrative embodiment. In the example of FIG. 9, the database workload values are shown in ten-minute increments for the Wednesday of the first week of quarters Q3 and Q4 of 2023 and the first quarter of 2024 (obtained from the table of FIG. 5). The standard deviation (or another tolerance band) of the three database workload values for the three quarters in each designated time interval is determined. In addition, a forecast of a database workload value in ten-minute increments for the Wednesday of the first week of the second quarter of 2024 is also obtained, using the techniques (and example data) of FIGS. 6 and 7.

The anomalous workload threshold is obtained, for example, as the sum of the standard deviation and the forecasted database workload for each designated ten-minute time interval. Representative measured database workload data is also shown for each designated ten-minute time interval for the Wednesday in the first week of the second quarter of 2024. The determined anomalous workload thresholds are compared with the corresponding measured workload data for each designated ten-minute time interval to identify whether a given workload is anomalous (or normal).

FIG. 10 is a flow diagram illustrating an exemplary implementation of a process for determining dynamic thresholds for anomaly detection with respect to forecasted data in accordance with an illustrative embodiment. A standard deviation is determined for each designated time interval, in a similar manner as the process of FIG. 8, so that the standard deviation can be used to determine dynamic thresholds for predicting anomalies with respect to future workloads.

In the example of FIG. 10, in step 1002 historical data is grouped based on a same time period (e.g., a same day of week, hour and minute for one or more consecutive fiscal quarters or seasons, for example). In step 1004, one or more outliers are removed. A standard deviation (or another tolerance band) and a median of the grouped data is analyzed in step 1006 for the desired historical time interval, as discussed further below in conjunction with FIG. 11. In step 1008, an anomalous workload threshold is determined by adding the standard deviation to the determined median value for the desired time interval. In step 1010, the anomalous workload threshold is compared with the forecasted workload data to identify an anomalous workload (e.g., for one or more future designated time intervals).

FIG. 11 illustrates an example of the dynamic anomaly threshold process of FIG. 8 in accordance with an illustrative embodiment. In the example of FIG. 11, the database workload values are shown in ten-minute increments for the Wednesday of the first week of quarters Q3 and Q4 of 2023 and the first and second quarters of 2024 (obtained from the first three rows of the table of FIG. 9, as well as the measured workload data for the Wednesday of the first week of the second quarter of 2024 that is ultimately compared to the dynamic threshold in FIG. 9). The standard deviation (or another tolerance band) and the median of the four database workload values for the four quarters in each designated time interval are determined.

In addition, the anomalous workload threshold is obtained as the sum of the standard deviation and the median values for the respective designated ten-minute time interval. Representative forecasted database workload data is also shown for each designated ten-minute time interval for the Wednesday in the first week of the third quarter of 2024. The determined anomalous workload thresholds are compared with the corresponding forecasted workload data for each designated ten-minute time interval to identify whether a given workload is anomalous (or normal).

FIG. 12 is a flow diagram illustrating an exemplary implementation of a training process for a supervised machine learning regression model that predicts a database performance breaking point in accordance with an illustrative embodiment. Generally, data is analyzed from various sources, such as historical database resource allocation data, historical database resource usage data, historical database workload data and/or historical incident data for each database. Then, the analyzed data is used to train one or more supervised machine learning regression models. In at least some embodiments, the one or more supervised machine learning regression models are trained to reflect the relationship between the various metrics captured in the analyzed data and a maximum workload that could be tolerated before an incident occurred. The determined maximum workload is defined as a breaking point for the database system.

Thus, the one or more supervised machine learning regression models forecast a dynamic breaking point threshold that may be used to identify a potential breakpoint for each database system. Any workload that exceeds the determined breaking point threshold can be considered a potential threat to the performance and/or uptime of a given database system. In at least some embodiments, a database breaking point comprises a bottleneck, that may cause one or more waiting workloads that may degrade the performance of a database.

In the example of FIG. 12, historical database resource allocation data (e.g., for multiple resources such as compute, memory and/or network resources) is analyzed in step 1202 to determine a database resource allocation specification. Historical database resource usage data is analyzed in step 1204 to determine a database resource utilization specification. Historical database workload data is analyzed in step 1206 to determine a database workload specification for active and waiting workloads. Historical incident data is analyzed in step 1208 to characterize a workload when an anomaly was detected.

In step 1210, during a training phase, the following data metrics and classification labels are applied to one or more supervised machine learning regression models: (i) training data comprising: (a) the database resource allocation specification, (b) the database resource utilization specification and (c) the database workload specification for active and waiting workloads, and (ii) one or more classification labels comprising the anomalous workload characterizations.

Figure 13:
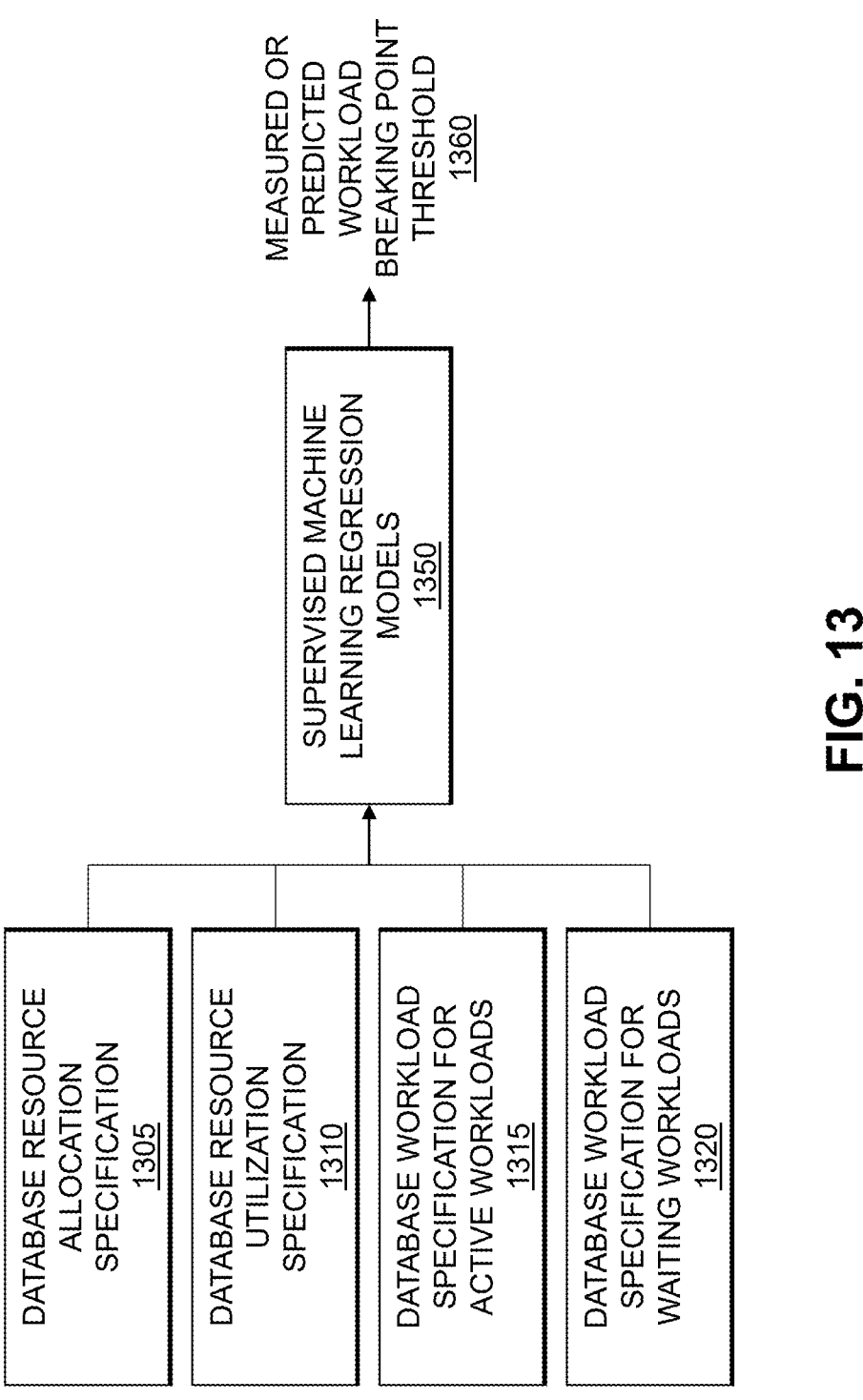
FIG. 13 illustrates an example of the prediction of a database performance breaking point of FIG. 12 in accordance with an illustrative embodiment.

FIG. 13 illustrates an example of the prediction of a database performance breaking point of FIG. 12 in accordance with an illustrative embodiment. In the example of FIG. 13, the database resource allocation specification 1305 (e.g., as determined in step 1202), the database resource utilization specification 1310 (e.g., as determined in step 1204), the database workload specification 1315 for active workloads (e.g., as determined in step 1206) and the database workload specification 1320 for waiting workloads (e.g., as determined in step 1206) are applied to one or more trained supervised machine learning regression models

1350. As noted above, the one or more trained supervised machine learning regression models 1350 are trained to forecast a measured or predicted workload breaking point threshold 1360 that may be used to identify a potential breakpoint for a given database system.

If an actual database workload exceeds the measured or predicted workload breaking point threshold 1360, an alert can be generated to notify one or more users (e.g., administrators) to evaluate a health of the database and to potentially stop one or more unnecessary sessions in order to maintain database performance and availability (thereby preventing the database from having downtime that could impact an organization). Similarly, if a forecasted database workload exceeds the measured or predicted workload breaking point threshold 1360, a warning can be generated to notify one or more users (e.g., administrators) to proactively monitor the database and potentially reschedule one or more planned jobs to prevent database congestion and/or unavailability.

FIG. 14 is a flow diagram illustrating an exemplary implementation of a method for predicting a database workload using database metrics, according to one or more embodiments of the disclosure. In the example of FIG. 14, a first set of designated database metrics characterizing one or more active sessions of at least one database workload for one or more designated time intervals is obtained in step 1400. A second set of designated database metrics characterizing one or more waiting sessions of the at least one database workload for the one or more designated time intervals is obtained in step 1402.

In step 1404, an amount of work performed by the one or more active sessions and the one or more waiting sessions of the at least one database workload within at least one designated time interval is evaluated by aggregating the first and second sets of designated database metrics for the at least one designated time interval. Historical workload data of the at least one database workload is applied in step 1406 to one or more machine learning models to obtain a forecast of an amount of work performed by the at least one database workload for one or more designated time intervals within at least one subsequent designated time period. At least one automated action is initiated in step 1408 using the forecast of the amount of work performed by the at least one database workload for the one or more designated time intervals.

In one or more embodiments, the one or more active sessions utilize one or more database resources and the one or more waiting sessions execute in response to an occurrence of one or more designated events. In an embodiment, the method of FIG. 14 may comprise characterizing (i) the amount of work performed by the at least one database workload for the one or more designated time intervals within a designated time period relative to a total amount of work performed by the at least one database workload in the designated time period; and (ii) the amount of work performed by the at least one database workload for the one or more designated time intervals within a designated repeating timeframe. The characterizations of the amount of work for each of the designated time intervals (e.g., ten-minute intervals) may be grouped according to the designated repeating timeframe (e.g., on a daily basis, for a given day of every month, or for a given day of every quarter or season); a tolerance band of the grouped characterizations may be determined; and at least one dynamic anomalous workload threshold for anomaly detection may be determined for each of the designated time intervals using the tolerance band of the corresponding grouped characterizations. One or more anomalous workloads may be identified by comparing the at least one dynamic anomalous workload threshold to one or more of measured workload data and forecasted workload data.

In some embodiments, two or more of: a database resource allocation specification, a database resource utilization specification, a database workload specification for one or more active workloads and a database workload specification for one or more waiting workloads may be applied to at least one supervised machine learning regression model to determine a predicted workload breaking point. The at least one supervised machine learning regression model may be trained using historical data associated with two or more of: the database resource allocation specification, the database resource utilization specification, the database workload specification for the one or more active workloads and the database workload specification for the one or more waiting workloads. One or more notifications may be generated in response to one or more database workloads exceeding the predicted workload breaking point. The historical workload data of the at least one database workload may comprise the first and second sets of designated database metrics.

In at least one embodiment, the at least one automated action may comprise generating one or more notifications related to the forecast of the amount of work performed by the at least one database workload or another communication to one or more designated recipients regarding the forecast of the amount of work performed by the at least one database workload; generating one or more signals related to the forecast of the amount of work performed by the at least one database workload (for example, alerting another system of an availability of the forecast of the amount of work performed by the at least one database workload, providing the forecast of the amount of work performed by the at least one database workload to a display system and/or enabling a display of the forecast of the amount of work performed by the at least one database workload); and/or controlling a performance of at least one action in another system using the forecast of the amount of work performed by the at least one database workload (such as uploading the forecast of the amount of work performed by the at least one database workload in the other system or otherwise storing the forecast of the amount of work performed by the at least one database workload in the other system and/or initiating an automated review of the forecast of the amount of work performed by the at least one database workload by the other system).

The particular processing operations and other network functionality described in conjunction with the flow diagrams of FIGS. 4, 6, 8, 10, 12 and 14, for example, are presented by way of illustrative example only and should not be construed as limiting the scope of the disclosure in any way. Alternative embodiments can use other types of processing operations for predicting a database workload using database metrics. For example, the ordering of the process steps may be varied in other embodiments, or certain steps may be performed concurrently with one another rather than serially. In one aspect, the process can skip one or more of the process steps. In other aspects, two or more of the process steps are performed simultaneously. The processing of one or more of the process steps can also be distributed between multiple components. In some aspects, additional process steps can be performed.

In some embodiments, techniques are provided for predicting a database workload using database metrics. In at least some embodiments, the disclosed database workload prediction techniques improve performance and reliability of database systems, and reduce the amount of time and resources needed to evaluate database workloads.

One or more embodiments of the disclosure provide improved methods, apparatus and computer program products for predicting a database workload using database metrics. The foregoing applications and associated embodiments should be considered as illustrative only, and numerous other embodiments can be configured using the techniques disclosed herein, in a wide variety of different applications.

It should also be understood that the disclosed database workload prediction techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for predicting a database workload using database metrics may be implemented using one or more processing platforms. One or more of the processing modules or other components may therefore each execute on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that executes on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based database workload prediction processing engine, or portions thereof, are illustratively implemented for use by tenants of such a multi-tenant environment.

Cloud infrastructure as disclosed herein can include cloud-based systems. Virtual machines provided in such systems can be used to implement at least portions of a cloud-based database workload prediction processing platform in illustrative embodiments. The cloud-based systems can include block storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may execute on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 15 and 16. These platforms may also be used to implement at least portions of other information processing systems in other embodiments.

Figure 15:
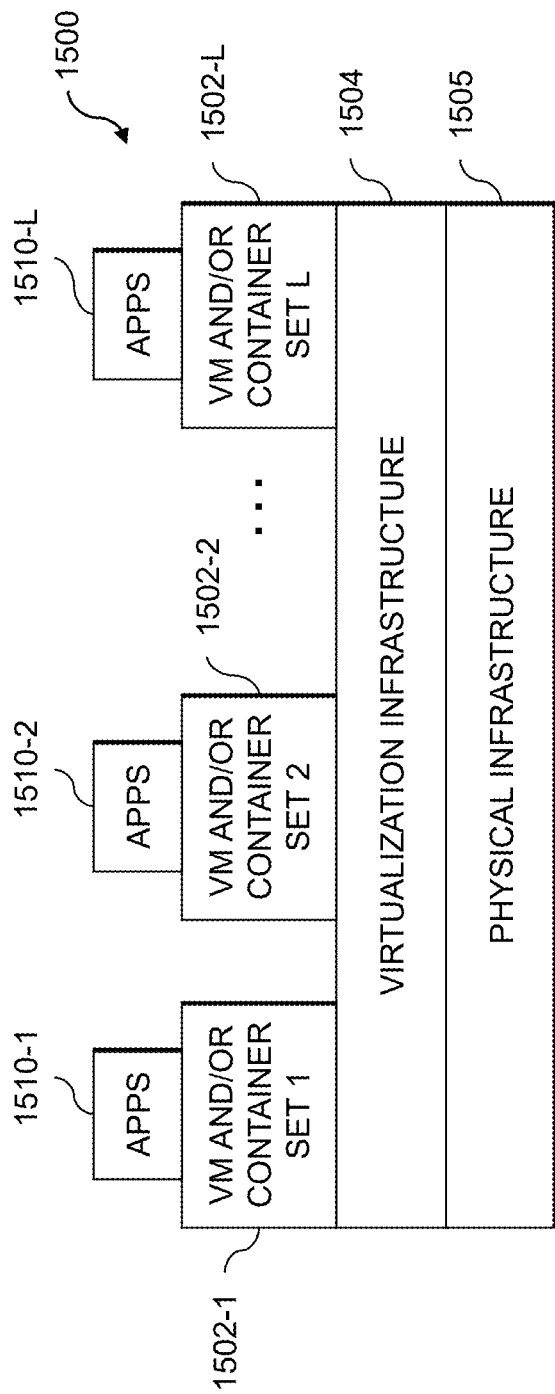
FIG. 15 illustrates an exemplary processing platform that may be used to implement at least a portion of one or more embodiments of the disclosure comprising a cloud infrastructure.

FIG. 15 shows an example processing platform comprising cloud infrastructure 1500. The cloud infrastructure 1500 comprises a combination of physical and virtual processing resources that may be utilized to implement at least a portion of an information processing system. The cloud infrastructure 1500 comprises multiple virtual machines (VMs) and/or container sets 1502-1, 1502-2, . . . 1502-L implemented using virtualization infrastructure 1504. The virtualization infrastructure 1504 executes on physical infrastructure 1505, and illustratively comprises one or more hypervisors and/or operating system level virtualization infrastructure. The operating system level virtualization infrastructure illustratively comprises kernel control groups of a Linux operating system or other type of operating system.

The cloud infrastructure 1500 further comprises sets of applications 1510-1, 1510-2, . . . 1510-L running on respective ones of the VMs/container sets 1502-1, 1502-2, . . . 1502-L under the control of the virtualization infrastructure 1504. The VMs/container sets 1502 may comprise respective VMs, respective sets of one or more containers, or respective sets of one or more containers running in VMs.

In some implementations of the FIG. 15 embodiment, the VMs/container sets 1502 comprise respective VMs implemented using virtualization infrastructure 1504 that comprises at least one hypervisor. Such implementations can provide database workload prediction functionality of the type described above for one or more processes running on a given one of the VMs. For example, each of the VMs can implement database workload prediction control logic and associated functionality for database anomaly and/or breaking point detection.

An example of a hypervisor platform that may be used to implement a hypervisor within the virtualization infrastructure 1504 is a compute virtualization platform which may have an associated virtual infrastructure management system such as server management software. The underlying physical machines may comprise one or more distributed processing platforms that include one or more storage systems.

In other implementations of the FIG. 15 embodiment, the VMs/container sets 1502 comprise respective containers implemented using virtualization infrastructure 1504 that provides operating system level virtualization functionality, such as support for Docker containers running on bare metal hosts, or Docker containers running on VMs. The containers are illustratively implemented using respective kernel control groups of the operating system. Such implementations can provide database workload prediction functionality of the type described above for one or more processes running on different ones of the containers. For example, a container host device supporting multiple containers of one or more container sets can implement one or more instances of database workload prediction control logic and associated functionality for database anomaly and/or breaking point detection.

As is apparent from the above, one or more of the processing modules or other components of the information processing system may each execute on a computer, server, storage device or other processing platform element. A given such element may be viewed as an example of what is more generally referred to herein as a processing device. The cloud infrastructure 1500 shown in FIG. 15 may represent at least a portion of one processing platform. Another example of such a processing platform is processing platform 1600 shown in FIG. 16.

The processing platform 1600 in this embodiment comprises at least a portion of the given system and includes a plurality of processing devices, denoted 1602-1, 1602-2, 1602-3, . . . 1602-K, which communicate with one another over a network 1604. The network 1604 may comprise any type of network, such as a WAN, a LAN, a satellite network, a telephone or cable network, a cellular network, a wireless network such as WiFi or WiMAX, or various portions or combinations of these and other types of networks.

The processing device 1602-1 in the processing platform 1600 comprises a processor 1610 coupled to a memory 1612. The processor 1610 may comprise a microprocessor, a microcontroller, an application specific integrated circuit (ASIC), a field programmable gate array (FPGA) or other type of processing circuitry, as well as portions or combinations of such circuitry elements, and the memory 1612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1602-1 is network interface circuitry 1614, which is used to interface the processing device with the network 1604 and other system components, and may comprise conventional transceivers.

The other processing devices 1602 of the processing platform 1600 are assumed to be configured in a manner similar to that shown for processing device 1602-1 in the figure.

Again, the particular processing platform 1600 shown in the figure is presented by way of example only, and the given system may include additional or alternative processing platforms, as well as numerous distinct processing platforms in any combination, with each such platform comprising one or more computers, storage devices or other processing devices.

Figure 16:
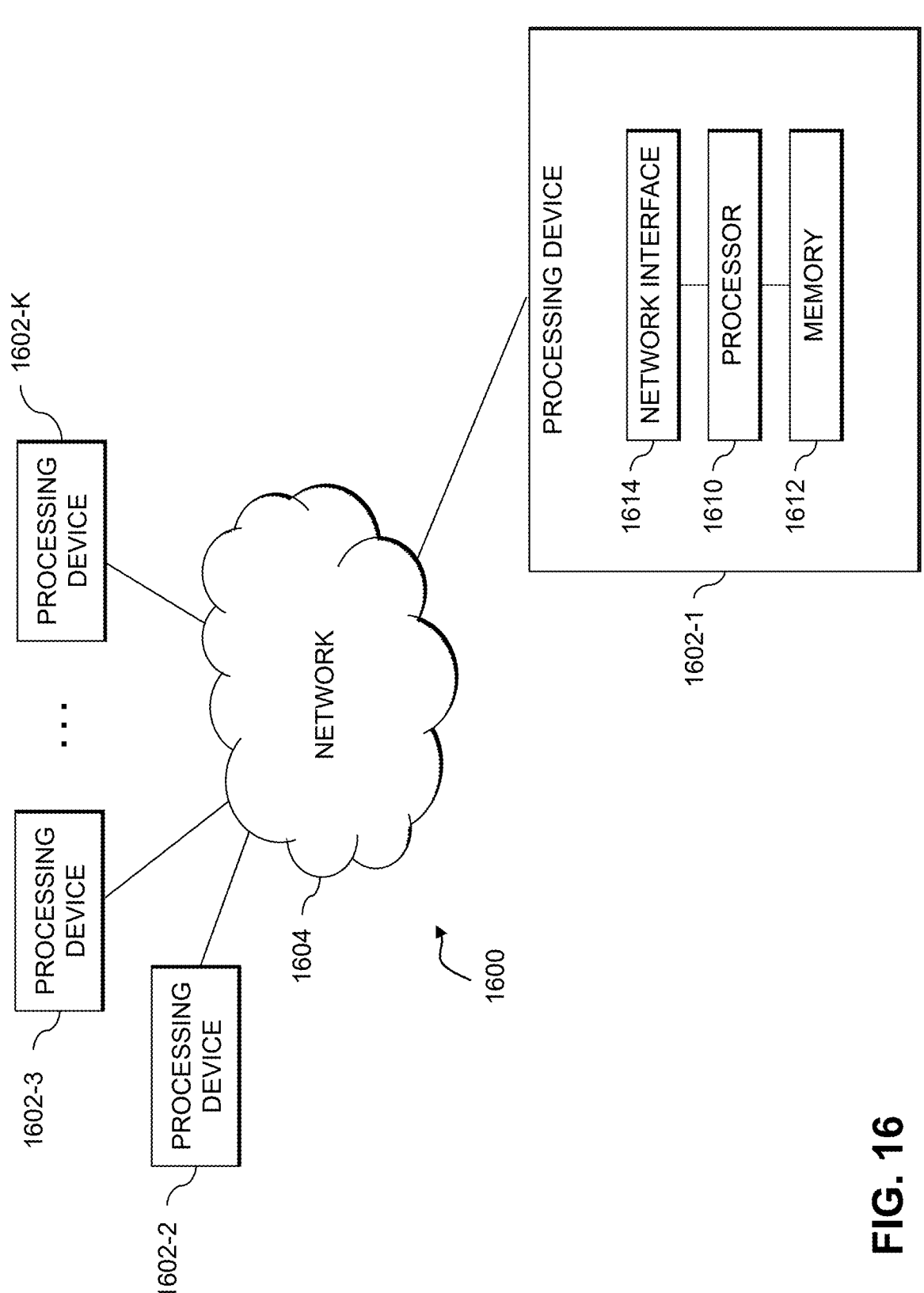
FIG. 16 illustrates another exemplary processing platform that may be used to implement at least a portion of one or more embodiments of the disclosure.

Multiple elements of an information processing system may be collectively implemented on a common processing platform of the type shown in FIG. 15 or 16, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

accessing a first set of designated database metrics characterizing one or more active sessions of at least one database workload for one or more designated time intervals, wherein the one or more active sessions utilize one or more database resources for performing one or more database operations;

accessing a second set of designated database metrics characterizing one or more waiting sessions of the at least one database workload for the one or more designated time intervals, wherein the one or more waiting sessions execute in response to an occurrence of one or more designated events, wherein the second set of designated database metrics is distinct from the first set of designated database metrics;

evaluating, by at least one processing device, an amount of work performed by the one or more active sessions and the one or more waiting sessions of the at least one database workload within at least one designated time interval by aggregating the first and second sets of designated database metrics within each of the at least one designated time interval;

applying, by the at least one processing device, historical workload data of the at least one database workload to one or more machine learning models to obtain a forecast of an amount of work performed by the at least one database workload for one or more designated time intervals within at least one subsequent designated time period; and initiating, by the at least one processing device, at least one automated action using the forecast of the amount of work performed by the at least one database workload for the one or more designated time intervals, wherein the at least one automated action comprises rescheduling an execution of one or more scheduled jobs of the at least one database workload based at least in part on the obtained forecast of the amount of work performed by the at least one database workload for the one or more designated time intervals within the at least one subsequent designated time period;

wherein the method is performed by at least one processing device comprising a processor coupled to a memory.

2. The method of claim 1, wherein the aggregating the first and second sets of designated database metrics within each of the at least one designated time interval comprises summing a database workload completion time for a plurality of database workload sessions within the at least one designated time interval divided by a duration of the at least one designated time interval.

3. The method of claim 1, further comprising characterizing (i) the amount of work performed by the at least one database workload for the one or more designated time intervals within a designated time period relative to a total amount of work performed by the at least one database workload in the designated time period; and (ii) the amount of work performed by the at least one database workload for the one or more designated time intervals within a designated repeating timeframe.

4. The method of claim 3, further comprising grouping the characterizations of the amount of work for each of the designated time intervals according to the designated repeating timeframe; determining a tolerance band of the grouped characterizations; and determining at least one dynamic anomalous workload threshold for anomaly detection for each of the designated time intervals using the tolerance band of the corresponding grouped characterizations.

5. The method of claim 4, further comprising identifying one or more anomalous workloads by comparing the at least one dynamic anomalous workload threshold to one or more of measured workload data and forecasted workload data.

6. The method of claim 1, further comprising applying two or more of: a database resource allocation specification, a database resource utilization specification, a database workload specification for one or more active workloads and a database workload specification for one or more waiting workloads to at least one supervised machine learning regression model to determine a predicted workload breaking point.

7. The method of claim 6, wherein the at least one supervised machine learning regression model is trained using historical data associated with the two or more of: the database resource allocation specification, the database resource utilization specification, the database workload specification for the one or more active workloads and the database workload specification for the one or more waiting workloads.

8. The method of claim 6, further comprising generating one or more notifications in response to one or more database workloads exceeding the predicted workload breaking point.

9. The method of claim 1, wherein the historical workload data of the at least one database workload comprises the first and second sets of designated database metrics.

10. An apparatus comprising:

at least one processing device comprising a processor coupled to a memory;

the at least one processing device being configured to implement the following steps:

accessing a first set of designated database metrics characterizing one or more active sessions of at least one database workload for one or more designated time intervals, wherein the one or more active sessions utilize one or more database resources for performing one or more database operations;

accessing a second set of designated database metrics characterizing one or more waiting sessions of the at least one database workload for the one or more designated time intervals, wherein the one or more waiting sessions execute in response to an occurrence of one or more designated events, wherein the second set of designated database metrics is distinct from the first set of designated database metrics;

evaluating, by at least one processing device, an amount of work performed by the one or more active sessions and the one or more waiting sessions of the at least one database workload within at least one designated time interval by aggregating the first and second sets of designated database metrics for within each of the at least one designated time interval;

applying, by the at least one processing device, historical workload data of the at least one database workload to one or more machine learning models to obtain a forecast of an amount of work performed by the at least one database workload for one or more designated time intervals within at least one subsequent designated time period; and initiating, by the at least one processing device, at least one automated action using the forecast of the amount of work performed by the at least one database workload for the one or more designated time intervals, wherein the at least one automated action comprises rescheduling an execution of one or more scheduled jobs of the at least one database workload based at least in part on the obtained forecast of the amount of work performed by the at least one database workload for the one or more designated time intervals within the at least one subsequent designated time period.

11. The apparatus of claim 10, wherein the aggregating the first and second sets of designated database metrics within each of the at least one designated time interval comprises summing a database workload completion time for a plurality of database workload sessions within the at least one designated time interval divided by a duration of the at least one designated time interval.

12. The apparatus of claim 10, further comprising characterizing (i) the amount of work performed by the at least one database workload for the one or more designated time intervals within a designated time period relative to a total amount of work performed by the at least one database workload in the designated time period; and (ii) the amount of work performed by the at least one database workload for the one or more designated time intervals within a designated repeating timeframe; grouping the characterizations of the amount of work for each of the designated time intervals according to the designated repeating timeframe; determining a tolerance band of the grouped characterizations; and determining at least one dynamic anomalous workload threshold for anomaly detection for each of the designated time intervals using the tolerance band of the corresponding grouped characterizations.

13. The apparatus of claim 10, further comprising applying two or more of: a database resource allocation specification, a database resource utilization specification, a database workload specification for one or more active workloads and a database workload specification for one or more waiting workloads to at least one supervised machine learning regression model to determine a predicted workload breaking point and generating one or more notifications in response to one or more database workloads exceeding the predicted workload breaking point.

14. The apparatus of claim 13, wherein the at least one supervised machine learning regression model is trained using historical data associated with the two or more of: the database resource allocation specification, the database resource utilization specification, the database workload specification for the one or more active workloads and the database workload specification for the one or more waiting workloads.

15. The apparatus of claim 10, wherein the historical workload data of the at least one database workload comprises the first and second sets of designated database metrics.

16. A non-transitory processor-readable storage medium having stored therein program code of one or more software programs, wherein the program code when executed by at least one processing device causes the at least one processing device to perform the following steps:

accessing a first set of designated database metrics characterizing one or more active sessions of at least one database workload for one or more designated time intervals, wherein the one or more active sessions utilize one or more database resources for performing one or more database operations;

accessing a second set of designated database metrics characterizing one or more waiting sessions of the at least one database workload for the one or more designated time intervals, wherein the one or more waiting sessions execute in response to an occurrence of one or more designated events, wherein the second set of designated database metrics is distinct from the first set of designated database metrics;

evaluating, by at least one processing device, an amount of work performed by the one or more active sessions and the one or more waiting sessions of the at least one database workload within at least one designated time interval by aggregating the first and second sets of designated database metrics for within each of the at least one designated time interval;

applying, by the at least one processing device, historical workload data of the at least one database workload to one or more machine learning models to obtain a forecast of an amount of work performed by the at least one database workload for one or more designated time intervals within at least one subsequent designated time period; and initiating, by the at least one processing device, at least one automated action using the forecast of the amount of work performed by the at least one database workload for the one or more designated time intervals, wherein the at least one automated action comprises rescheduling an execution of one or more scheduled jobs of the at least one database workload based at least in part on the obtained forecast of the amount of work performed by the at least one database workload for the one or more designated time intervals within the at least one subsequent designated time period.

17. The non-transitory processor-readable storage medium of claim 16, further comprising characterizing (i) the amount of work performed by the at least one database workload for the one or more designated time intervals within a designated time period relative to a total amount of work performed by the at least one database workload in the designated time period; and (ii) the amount of work performed by the at least one database workload for the one or more designated time intervals within a designated repeating timeframe; grouping the characterizations of the amount of work for each of the designated time intervals according to the designated repeating timeframe; determining a tolerance band of the grouped characterizations; and determining at least one dynamic anomalous workload threshold for anomaly detection for each of the designated time intervals using the tolerance band of the corresponding grouped characterizations.

18. The non-transitory processor-readable storage medium of claim 16, further comprising applying two or more of: a database resource allocation specification, a database resource utilization specification, a database workload specification for one or more active workloads and a database workload specification for one or more waiting workloads to at least one supervised machine learning regression model to determine a predicted workload breaking point and generating one or more notifications in response to one or more database workloads exceeding the predicted workload breaking point.

19. The non-transitory processor-readable storage medium of claim 18, wherein the at least one supervised machine learning regression model is trained using historical data associated with the two or more of: the database resource allocation specification, the database resource utilization specification, the database workload specification for the one or more active workloads and the database workload specification for the one or more waiting workloads.

20. The non-transitory processor-readable storage medium of claim 16, wherein the historical workload data of the at least one database workload comprises the first and second sets of designated database metrics.

\* \* \* \* \*